Sept. 12, 1967
P. NICHOLSON
3,341,637
SUPPORTING OF ELECTRIC CABLES WHILST TRAVELLING
IN THE DIRECTION OF THEIR LENGTH
Filed Nov. 10, 1964
3 Sheets-Sheet 1
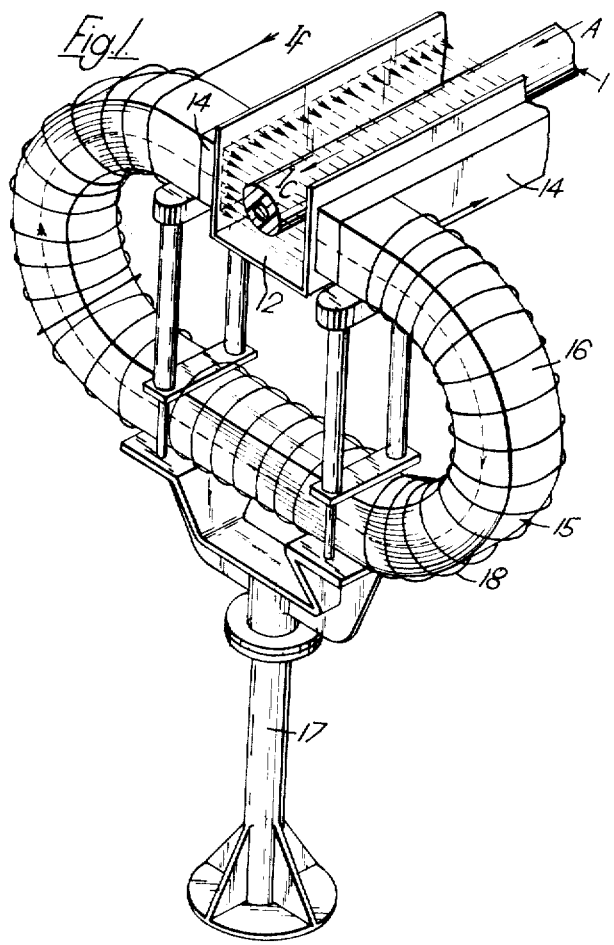
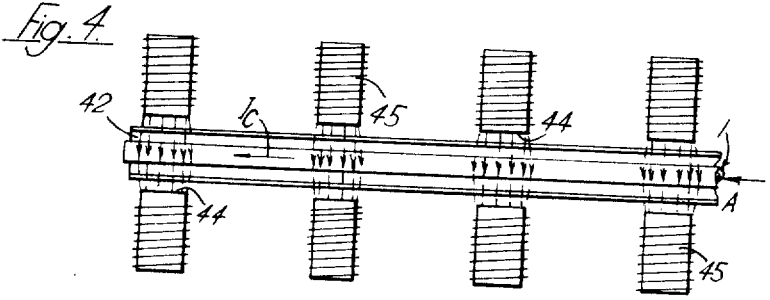
Inventor
Peter Nicholson
By
Watt Burden Robinson-Webb
Attorney

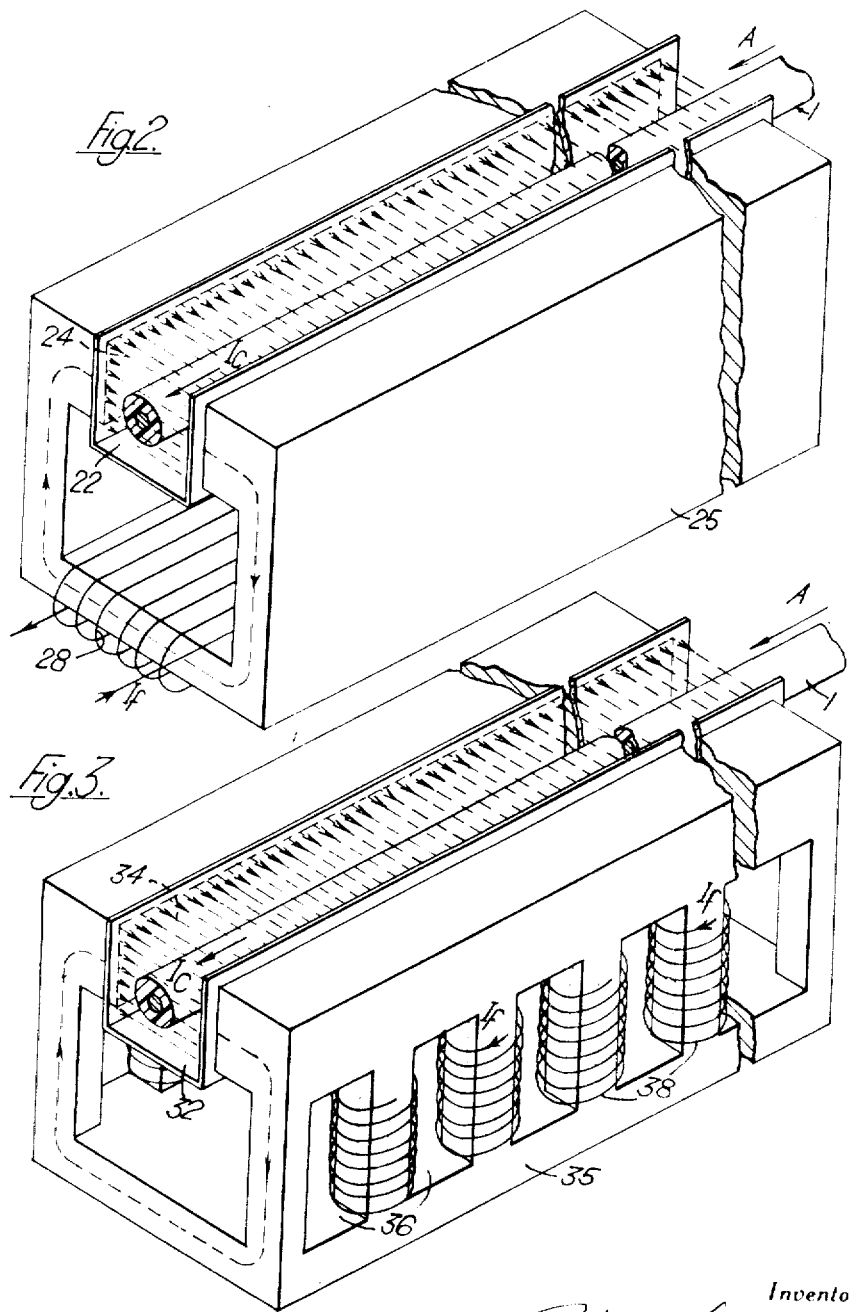

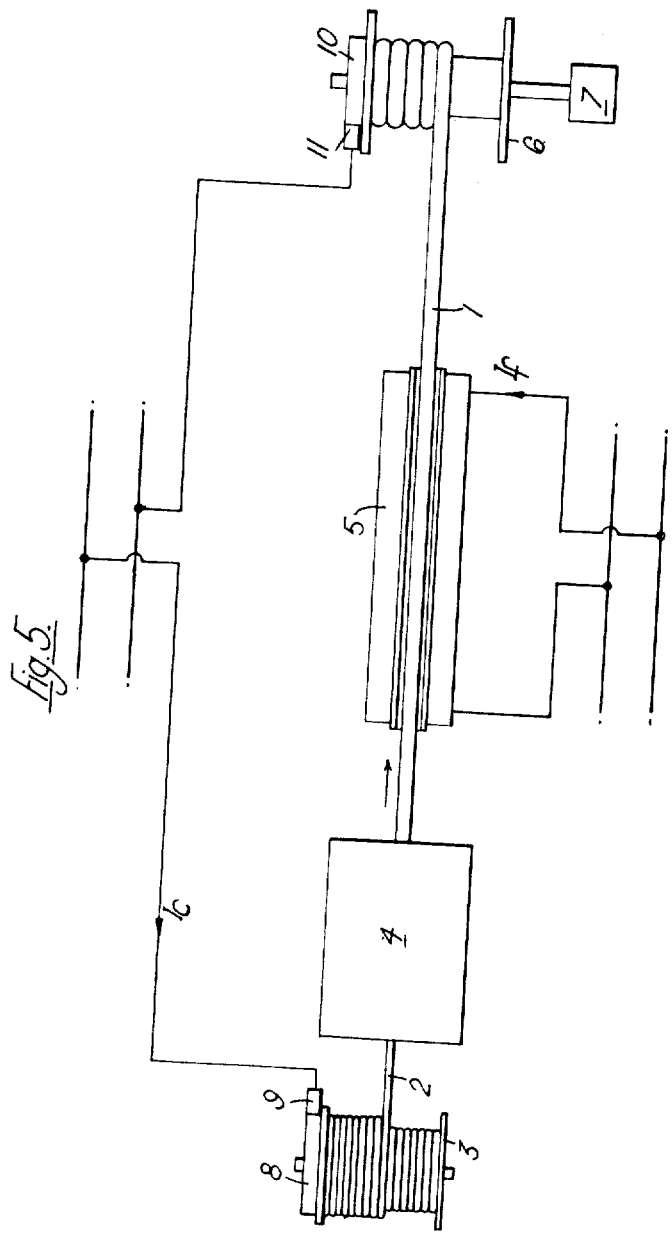

United States Patent Office 3,341,637
Patented Sept. 12, 1967

3,341,637
SUPPORTING OF ELECTRIC CABLES WHILST TRAVELLING IN THE DIRECTION OF THEIR LENGTH
Peter Nicholson, Gravesend, Kent, England, assignor to British Insulated Callender's Cables Limited, London, England, a British company
Filed Nov. 10, 1964, Ser. No. 410,085
Claims priority, application Great Britain, Nov. 13, 1963, 44,851/63
4 Claims. (Cl. 264—22)

In the manufacture or subsequent treatment of elongated bodies it is frequently necessary to move the body lengthwise between two mutually spaced supporting points without allowing it to contact any intermediate support. Examples of this are to be found in the manufacture of insulated electric cables which involves the application of an insulating covering to a cable conductor, or the application of an insulating or conductive rubber or plastics sheath to a cable core, by a horizontal extrusion process. Such coverings and sheaths must be strengthened, as by a cooling, vulcanising or other treatment, before they can withstand the tendency to deformation due to pressure exerted on them by the weight of the covered or sheathed cable as the cable passes over the support on the delivery side of the extrusion machine. In the case of small diameter cables this strengthening process can be effected whilst maintaining the cable under sufficient tension to keep it clear of the floor of the treatment vessel.

In the case of large diameter cables difficulties arise where the cable must travel in a substantially rectilinear path between supports. The tension required to maintain a rectilinear length of cable between spaced support points becomes very great and, as this tension can only be applied at the leading end of the cable and hence only through the applied covering, as by means of a capstan or an endless belt type of haul-off device, some deformation of even the strengthened covering and/or sheath and even of the cable conductor itself is likely to occur.

It is an object of the present invention to provide a novel method of and apparatus for effectively supporting a cable or other elongated, electrically conductive body advancing lengthwise with a horizontal component of travel without the need to maintain it under heavy tension to ensure that it travels in a substantially rectilinear path between mutually spaced positive supports. By the term "positive support" I mean supporting members that are in physical contact with a part of the external surface of the advancing cable or other elongated body.

In accordance with my invention I effectively support a cable or other elongated, electrically conductive body (hereinafter for convenience and where the context permits referred to as a "cable") whilst advancing in the direction of its length with a horizontal component of travel by passing it through a uni-directional magnetic field whose direction is substantially horizontal and transverse to the direction of travel of the cable and by passing at the same time a uni-directional electric current along the cable conductor, the strength of the magnetic field and the magnitude and direction of the current along the cable conductor being such that the vertical component of the resulting magnetic force exerted on the cable opposes, and preferably counterbalances, the gravitational forces thereon.

The magnetic field may be continuous in the direction of travel of the cable over a distance corresponding to the distance between the positive supports for the cable or to a major part of such distance. Alternatively a number of magnetic fields of smaller width may be established at intervals along the path of the cable between its mutually spaced supports. In the latter case the field strength of each may be designed to support against the effect of gravity a length of cable equal to the spacing of the fields.

The invention is especially useful in connection with the manufacture of high voltage plastics insulated power cables by methods which involve application of the conductor screen, the dielectric wall and/or the dielectric screen by horizontal extrusion and the gradual cooling of these extruded bodies by running the cable through a temperature-controlled bath or succession of baths of cooling fluid, which may be in the form of a liquid, a gaseous fluid or a fluidised powder.

In accordance with a further aspect of the invention I provide, for use in cooling and supporting an extruded plastics covered cable as the cable leaves the extrusion plant and advances in the direction of its length with a horizontal component of travel, apparatus comprising a trough for cooling fluid, the trough being made of substantially non-magnetic material or having at least a part of its base wall made of such material and, in combination with the trough an electro-magnet having two pole faces, the trough being so positioned between the pole faces of the electro-magnet that each of the pole faces lies in contact with or in close proximity to the neighbouring side wall of the trough.

The invention will now be further described in regard to its application to such cable manufacture, by way of example, with reference to the accompanying drawings, in which:

FIGURE 1 is a fragmental, diagrammatic perspective view of a preferred form of apparatus for use in cooling and supporting an extruded plastics covered cable as the cable leaves an extrusion plant;

FIGURES 2 and 3 are fragmental, diagrammatic perspective views of alternative forms of cable cooling and supporting apparatus, and FIGURE 4 is a diagrammatic plan view of a fourth form of such apparatus.

FIGURE 5 is a diagrammatic plan illustrating a method of manufacturing an extruded plastics covered cable which incorporates the use of cable cooling and supporting apparatus in accordance with the present invention.

As an extruded plastics covered cable leaves the orifice of an extrusion plant the plastics materials of the covering is at a temperature very near that of its melting point and it is common practice to pass the plastics covered cable along a trough containing a coolant, such as water. To reduce cavitation of the plastics covering the cooling effect should be gradual. This necessity is met by the provision of a single, long cooling trough or a series of shorter cooling troughs and by the provision of arrangements for controlling the temperature of the coolant from a maximum at the end of the trough or series of troughs next to the extrusion orifice to a minimum at the far end of the trough or series of troughs.

In each of the embodiments illustrated in the drawings a cable 1 as hereinbefore defined comprising a conductor with an extruded plastics covering travels in the direction indicated by the arrow A from an extrusion plant (not shown) through a trough which will normally contain water serving as a coolant for the plastics covering. For the sake of clarity the water is not illustrated in the drawings. The trough may constitute a single cooling trough of great length or it may constitute one trough of a series of troughs of shorter length. Unless otherwise stated the construction of the cable supporting apparatus associated with the trough of each embodiment will be of similar form whether the trough is a single trough of great length or one trough of a series of shorter troughs.

In the preferred form of cable cooling and supporting apparatus illustrated in FIGURE 1 a trough 12 is made of a substantially non-magnetic material, e.g. low permeability stainless steel and is positioned between a pair of elongated, mild steel pole pieces 14 to which are secured two or more than two electro-magnets 15, of which only one is shown, mutually spaced along the length of the pole pieces. The pole pieces 14 preferably have a length which approximates to the length of the trough 12 and a height which approximates to the height of the trough. The gap between the faces of the pole pieces is equal to or somewhat greater than the external width of the trough with the result that each of the pole faces lies in contact with or in close proximity to the neighbouring side wall of the trough. Each electro-magnet 15 comprises a laminated core 16 of substantially C-shape made by convolutely winding silicon/steel alloy strip and cutting a gap in one limb of the core. The core is supported on a pedestal 17, and a magnet winding 18 is wound around the laminated core.

A current $I_f$ applied to each of the magnet windings 18 will be such as to provide between the pair of elongated pole pieces 14 common to all of the electro-magnets 15 a horizontal uni-directional magnetic field which is continuous along the length of the trough 12 and extends transverse to the axis thereof. At the same time, as the cable 1 runs along the trough 12, a uni-directional current $I_c$ is passed along the cable conductor in the direction indicated and is of such a magnitude that the vertical component of the resulting magnetic force exerted on the cable opposes, and preferably counterbalances, the gravitational forces thereon, whereby the cable passing through the coolant in the trough is supported out of physical contact with any part of the trough.

As an indication of the magnetic and current requirements for the electro-magnetic support of a 20′ length of 3 sq. in. conductor weighing 12 lbs. per ft., the following details are given by way of example:

Size of common pole pieces:
  Width _____ 4.25″ (10.8 cm.).
  Thickness _____ 1.62″ (4.1 cm.).
  Length _____ 20′ (6.1 m.).
Gap between faces of pole pieces _____ 8″ (20.3 cm.).
Number of mutually spaced magnets __ 11.
Spacing between magnets _____ 21″ (53.3 cm.).
Ampere-turns/core _____ 40,000.
Current through cable conductor _____ 1000 amperes.

In the alternative form of cable cooling and supporting apparatus shown in FIGURE 2 a trough 22 of substantially non-magnetic material is positioned between the elongated pole pieces 24 of a single channel-shaped magnet 25. Alternatively the side walls may be of magnetic material and a part, or preferably the whole, of the base wall of the trough 22 may be of substantially non-magnetic material. The channel-shaped magnet 25 is preferably an electro-magnet and in such case a magnet winding 28 may be conveniently applied as shown around the base wall of the channel. The gravitational forces on the cable passing through the trough 22 are opposed by the vertical component of the magnetic force which is obtained in a similar manner to that described with reference to FIGURE 1, whereby the cable is supported out of contact with the trough.

As will be seen on referring to FIGURE 3, in the third form of apparatus each limb of a channel-shaped magnet 35 is subdivided in the direction of length of a trough 32 positioned between its elongated pole pieces 34 by windows 36 located at intervals along the limb. The windows 36 permit each limb to carry two or more magnet windings 48 which may be connected in series or in parallel or in series parallel as may be convenient. The vertical component of the magnetic force which opposes the gravitational forces on the cable is obtained in a similar manner to that described with reference to FIGURE 1.

If preferred, in the apparatus shown in FIGURES 2 and 3, the elongated pole pieces may themselves form the side walls or parts of the side walls of the cooling trough, the base wall or the corresponding parts of the base wall being formed by an elongated plate or plates of non-magnetic material making a liquid-tight joint at its or their edges with the neighbouring pole pieces of the magnet or magnets.

Where a series of two or more cooling troughs are provided these may be spaced apart endwise and each trough may be associated with magnets or a channel-shaped magnet as shown in FIGURES 1, 2 or 3. Alternatively a magnet may be mounted in the gap between each two successive troughs, a magnet may be mounted between the extrusion plant and the first trough of the series and a further magnet beyond the final trough of the series.

FIGURE 4 illustrates diagrammatically a fourth form of apparatus in which a single continuous trough 42 is used. The trough 42 is positioned between the faces of the pole pieces 44 of two or more mutually spaced magnets 45 each of whose pole pieces has a height approximating to that of the trough and each of whose pole faces lies in contact with or in close proximity to the neighbouring side wall of the trough. In this case a number of magnetic fields of smaller length are established at intervals along the length of the trough 42. If desired the single trough 42 may be built up of lengths which are of magnetic material mutually separated by one or more lengths which is or are of substantially non-magnetic material a magnet being located at a part that is of substantially non-magnetic material.

As will be seen on referring to FIGURE 5 a cable 1 which comprises a conductor 2 with an extruded plastics covering is made by mounting a reel 3 wound with the bare conductor 2 in such a way that the conductor is drawn off from the reel by a take-up drum 6 which is, for example, driven by a motor 7. In its passage from the reel 3 to the take-up drum 6 the bare conductor 2 passes through an extrusion plant 4 where it is provided with the extruded plastics covering and, on emerging from the orifice of the extrusion plant, the plastics covered conductor passes through cooling and supporting apparatus 5 in accordance with the present invention. The cable cooling and supporting apparatus 5 may take any one of the alternative forms of apparatus hereinbefore described but where the trough or series of troughs containing the coolant are positioned between the pole pieces of one or more than one electro-magnet a current $I_f$ is applied to the electro-magnet winding or windings in such a way that a horizontal uni-directional magnetic field extends transverse to the axis of the trough. At the same time a uni-directional current $I_c$ is led into (or out of) the bare conductor 2 through a brush 9 engaging a slip ring 8 to which an end of the bare conductor is electrically connected and which is mounted on the reel 3 and the current is led out (or into) the conductor through a brush 11 engaging a slip ring 10 to which the end of the plastics covered conductor is electrically connected and which is mounted on the take-up drum 6 or its driving spindle. The current for energising the cable may be led into the conductor at one end and out at the other by any other convenient manner. As previously indicated the direction of the transverse magnetic field of the electro-magnet and the magnitude of the conductor current $I_c$ are so arranged that the vertical component of the resulting magnetic force exerted on the cable 1 opposes, and preferably counterbalances, the gravitational forces on the cable. In this way the extruded plastics covered cable 1 emerging from the extrusion orifice and entering the cooling trough or troughs is supported out of physical contact with the trough or troughs or any other support until it reaches the take-up drum.

Naturally the continuous passage of a heavy current through the conductor during the operation of extruding a plastics covering on it will raise its temperature. The extent to which this is permissible will depend upon the particular plastics material which has been and/or is to be applied to the cable conductor, and upon extrusion conditions. In general the maximum current permissible will be used. The strength and effective cross-sectional area of the field will then be chosen or adjusted to give the lift necessary. This lift may be slightly less than the gravitational forces on the cable —the small balance being provided by the minimum tension in the conductor required for the advancement of the cable through the extrusion or other machine and/or any buoyancy effect of the cable in the coolant.

In place of electro-magnets permanent magnets may be used or to provide some flexibility of control a combination of permanent magnets and electro-magnets may be used.

What I claim as my invention is:

1. In the manufacture of an elongated cable as hereinbefore defined by a method which involves application of an outer covering material to an elongated conductor by a horizontal extrusion plant and treatment to strengthen this extruded outer covering by running the cable in the direction of its length with a horizontal component of travel through a treatment vessel which has a base wall, the improvement consisting of imparting support to the cable between the extrusion plant and a positive support by arranging for the cable running through the treatment vessel to pass through a uni-directional magnetic field whose direction is substantially horizontal and transverse to the direction of travel of the cable and by continuously passing a uni-directional electric current along the conductor, the strength of the magnetic field and the magnitude and direction of the current in the conductor being such that the vertical component of the resulting magnetic force exerted on the cable opposes the gravitational forces thereon to an extent to maintain the cable out of contact with the base wall of the treatment vessel without the need to maintain the advancing cable under heavy tension.

2. A method as claimed in claim 1, wherein the uni-directional magnetic field is continuous in the direction of travel of the cable over a distance corresponding to at least a major part of the distance between the extrusion plant and the positive support.

3. A method as claimed in claim 1, wherein the cable is passed through a plurality of magnetic fields established at intervals along the path of the cable between the extrusion plant and the positive support.

4. In the manufacture of an elongated high voltage power cable comprising a conductor and a plastic covering by a method which involves application to the conductor of the covering by a horizontal extrusion plant and gradual cooling of the covering by running the cable in the direction of its length with a horizontal component of travel through at least one temperature-controlled bath which has a base wall and which contains a cooling fluid the improvement consisting of, imparting support to the cable between the extrusion plant and a positive support by arranging for the cable running through the cooling bath to pass through a uni-directional magnetic field whose direction is substantially horizontal and transverse to the direction of travel of the cable and by continuously passing a uni-directional electric current along the conductor, the strength of the magnetic field and the magnitude and direction of the current in the conductor being such that the vertical component of the resulting magnetic force exerted on the cable opposes the gravitational forces thereon to an extent to maintain the cable out of contact with the base wall of the bath without the need to maintain the advancing cable under heavy tension.

References Cited
UNITED STATES PATENTS

| | | | |
|---|---|---|---|
| 2,324,645 | 7/1943 | Prehler | 91—53 |
| 2,377,908 | 6/1945 | Slaughter | 264—22 X |

ROBERT F. WHITE, *Primary Examiner.*

R. B. MOFFITT, *Assistant Examiner.*